(12) United States Patent
Naito et al.

(10) Patent No.: US 11,365,787 B2
(45) Date of Patent: Jun. 21, 2022

(54) TRANSMISSION AND WORK VEHICLE

(71) Applicant: KOMATSU LTD., Tokyo (JP)

(72) Inventors: Shinichi Naito, Tokyo (JP); Takehiro Komatsu, Tokyo (JP); Shu Takeda, Tokyo (JP); Kyousuke Moriguchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/413,690

(22) PCT Filed: Feb. 17, 2020

(86) PCT No.: PCT/JP2020/006054
§ 371 (c)(1),
(2) Date: Jun. 14, 2021

(87) PCT Pub. No.: WO2020/195327
PCT Pub. Date: Oct. 1, 2020

(65) Prior Publication Data
US 2022/0010864 A1 Jan. 13, 2022

(30) Foreign Application Priority Data
Mar. 26, 2019 (JP) .............................. JP2019-057931

(51) Int. Cl.
*F16H 3/72* (2006.01)
*B60K 6/00* (2006.01)
(Continued)

(52) U.S. Cl.
CPC ................ *F16H 3/72* (2013.01); *B60K 6/00* (2013.01); *B60K 17/08* (2013.01); *E02F 9/202* (2013.01); *F16H 2200/201* (2013.01)

(58) Field of Classification Search
CPC ............. F16H 3/72; F16H 3/724; F16H 3/727
See application file for complete search history.

(56) References Cited

U.S. PATENT DOCUMENTS

| | | | |
|---|---|---|---|
| 2008/0096712 A1* | 4/2008 | Hiraki | ..................... F16H 3/728 475/5 |
| 2011/0230295 A1 | 9/2011 | Hiraki et al. | |
| 2019/0291564 A1* | 9/2019 | Warth | ..................... F16H 19/04 |

FOREIGN PATENT DOCUMENTS

| | | |
|---|---|---|
| JP | 9-166197 A | 6/1997 |
| JP | 2006-329244 A | 12/2006 |

(Continued)

OTHER PUBLICATIONS

The International Search Report for the corresponding international application No. PCT/JP2020/006054, dated Apr. 14, 2020.

*Primary Examiner* — Derek D Knight

(74) *Attorney, Agent, or Firm* — Global IP Counselors, LLP

(57) ABSTRACT

A transmission includes an input shaft, an output shaft, a first planetary gear mechanism, a second planetary gear mechanism, and a first variable device. The first planetary gear mechanism includes a first carrier connected to the input shaft, a first planetary gear connected to the first carrier, a first sun gear connected to the first planetary gear, and a ring gear connected to the first planetary gear. The second planetary gear mechanism includes a second sun gear connected to the first carrier, a second planetary gear connected to the second sun gear, and a second ring gear connected to the second planetary gear and connected to the first ring gear. The first variable device is connected to the first ring gear and the second ring gear to continuously change a speed ratio of the output shaft to the input shaft.

12 Claims, 3 Drawing Sheets

(51) Int. Cl.
    *B60K 17/08*    (2006.01)
    *E02F 9/20*    (2006.01)

(56) References Cited

FOREIGN PATENT DOCUMENTS

| JP | 2011-33192 A | 2/2011 |
|---|---|---|
| JP | 2012-149769 A | 8/2012 |

* cited by examiner

FIG. 3A
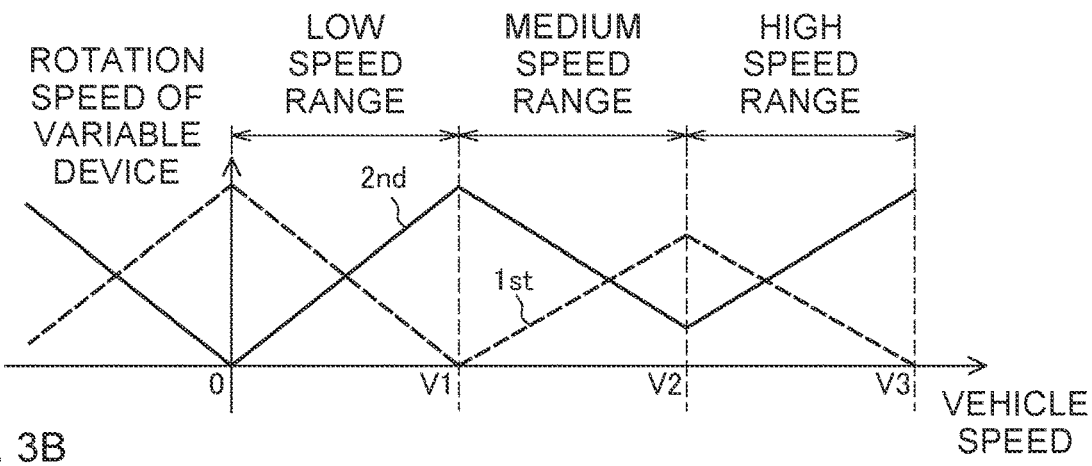
FIG. 3B
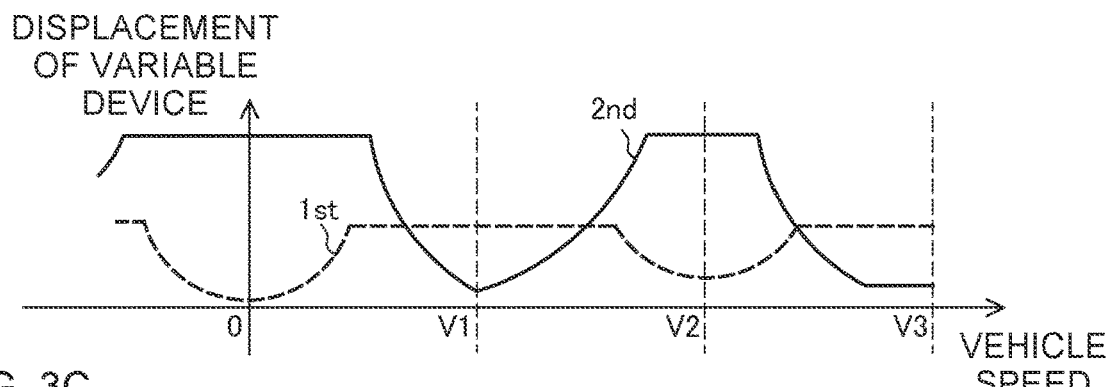
FIG. 3C
| LOW SPEED CLUTCH | ON | (OFF) | (OFF) |
| MEDIUM SPEED CLUTCH | (OFF) | ON | (OFF) |
| HIGH SPEED CLUTCH | (OFF) | (OFF) | ON |
FIG. 3D
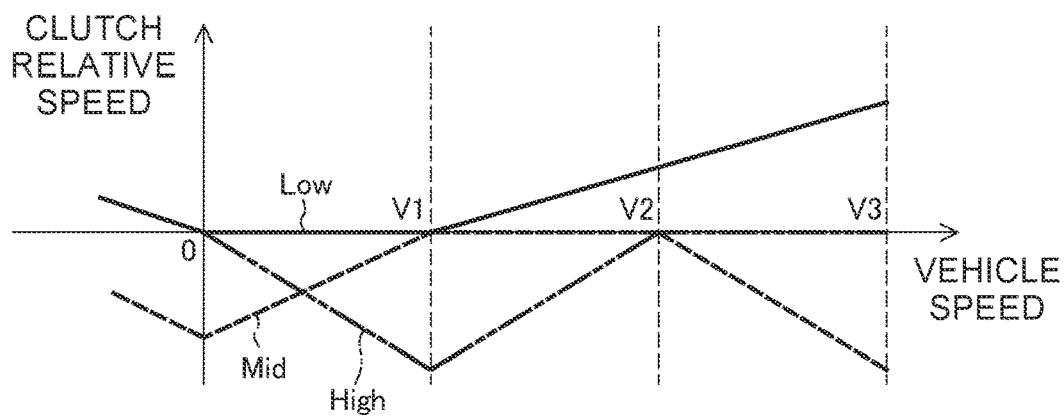

TRANSMISSION AND WORK VEHICLE

This application is a U.S. National stage application of International Application No. PCT/JP2020/006054, filed on Feb. 17, 2020. This U.S. National stage application claims priority under 35 U.S.C. § 119(a) to Japanese Patent Application No. 2019-057931, filed in Japan on Mar. 26, 2019, the entire contents of which are hereby incorporated herein by reference.

BACKGROUND

Field of the Invention

The present disclosure relates to a transmission and a work vehicle.

Background Information

Conventionally, continuously variable transmissions such as HMT (Hydraulic Mechanical Transmission) have been known. For example, the transmission of Japan Laid-open Patent Application Publication No. 2006-329244 includes a first planetary gear mechanism, a second planetary gear mechanism, a first pump/motor, and a second pump/motor.

An input shaft of the transmission is connected to a sun gear of the first planetary gear mechanism via a FR switching mechanism. A ring gear of the first planetary gear mechanism is connected to a carrier of the second planetary gear mechanism via a clutch. A ring gear of the second planetary gear mechanism is connected to an output shaft. The first pump/motor is connected to a carrier of the first planetary gear mechanism. The second pump/motor is connected to the ring gear of the first planetary gear mechanism.

SUMMARY

In the transmission of Japan Laid-open Patent Application Publication No. 2006-329244, the ring gear of the first planetary gear mechanism is connected to the clutch. The ring gear have a larger outer diameter than other gears. Therefore, as the clutch becomes larger, the transmission becomes larger. Further, the ring gear of the first planetary gear mechanism and the ring gear of the second planetary gear mechanism each have an external tooth type output gear Therefore, the transmission becomes even larger.

An object of the present disclosure is to reduce a size of a continuously variable transmission by a variable device.

A transmission according to one aspect includes an input shaft, an output shaft, a first planetary gear mechanism, a second planetary gear mechanism, and a first variable device. The first planetary gear mechanism includes a first carrier, a first planetary gear, a first sun gear, and a first ring gear. The first carrier is connected to the input shaft. The first planetary gear is connected to the first carrier. The first sun gear is connected to the first planetary gear. The first ring gear is connected to the first planetary gear.

The second planetary gear mechanism includes a second sun gear, a second planetary gear, and a second ring gear. The second sun gear is connected to the first carrier. The second planetary gear is connected to the second sun gear. The second ring gear is connected to the second planetary gear. The second ring gear is connected to the first ring gear. The first variable device continuously changes a speed ratio of the output shaft to the input shaft. The first variable device is connected to the first ring gear and the second ring gear.

A work vehicle according to another aspect includes the transmission described above.

In the transmission according to the present disclosure, the second ring gear is connected to the first ring gear. Therefore, a large clutch connected to the first ring gear is unnecessary. Further, it is not necessary to provide external tooth type gears on both the first ring gear and the second ring gear. Therefore, the transmission can be downsized.

BRIEF DESCRIPTION OF THE DRAWINGS

FIG. 3A, FIG. 3B, FIG. 3C and FIG. 3D are operation characteristic diagrams of the transmission.

DETAILED DESCRIPTION OF EMBODIMENT(S)

Figure 1:
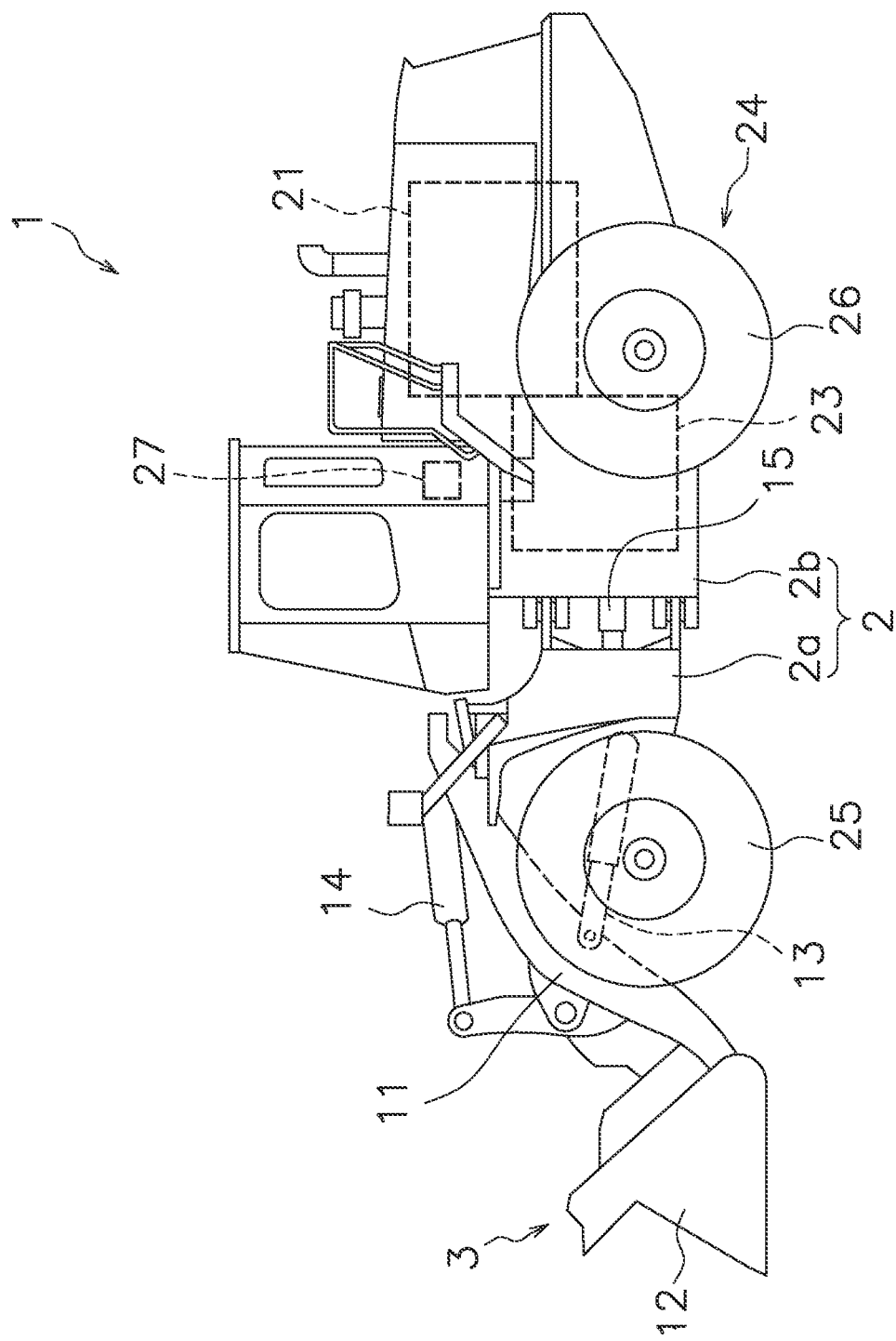
FIG. 1 is a side view of a work vehicle according to an embodiment.

Hereinafter, embodiments of the present invention will be described with reference to the drawings. FIG. 1 is a side view of the work vehicle 1 according to an embodiment of the present invention. As illustrated in FIG. 1, the work vehicle 1 includes a vehicle body 2 and a work implement 3.

The vehicle body 2 includes a front vehicle body 2a and a rear vehicle body 2b. The rear vehicle body 2b is connected to the front vehicle body 2a so as to be able to turn left and right. A hydraulic cylinder 15 is connected to the front vehicle body 2a and the rear vehicle body 2b. As the hydraulic cylinder 15 expands and contracts, the front vehicle body 2a turns left and right with respect to the rear vehicle body 2b.

The work implement 3 is used for work such as excavation. The work implement 3 is attached to the front vehicle body 2a. The work implement 3 includes a boom 11, a bucket 12, and hydraulic cylinders 13 and 14. The boom 11 and the bucket 12 operate as the hydraulic cylinders 13 and 14 expand and contract.

The work vehicle 1 includes an engine 21, a transmission 23, and a traveling device 24. The engine 21 is an internal combustion engine such as a diesel engine. The transmission 23 is connected to the engine 21. The transmission 23 is configured to change the gear ratio continuously.

The traveling device 24 travels the work vehicle 1. The traveling device 24 includes front wheels 25 and rear wheels 26. The front wheels 25 is provided on the front vehicle body 2a. The rear wheels 26 is provided on the rear vehicle body 2b. The front wheels 25 and the rear wheels 26 are connected to the transmission 23 via an axle (not illustrated).

The work vehicle 1 includes a hydraulic pump (not illustrated). The hydraulic pump is connected to the engine 21. The hydraulic pump is driven by the engine 21 and discharges hydraulic fluid. The hydraulic fluid discharged from the hydraulic pump is supplied to the hydraulic cylinders 13 to 15 described above.

The work vehicle 1 includes a controller 27. The controller 27 includes, for example, a processor and a memory. The controller 27 controls the engine 21 and the transmission 23.

Figure 2:
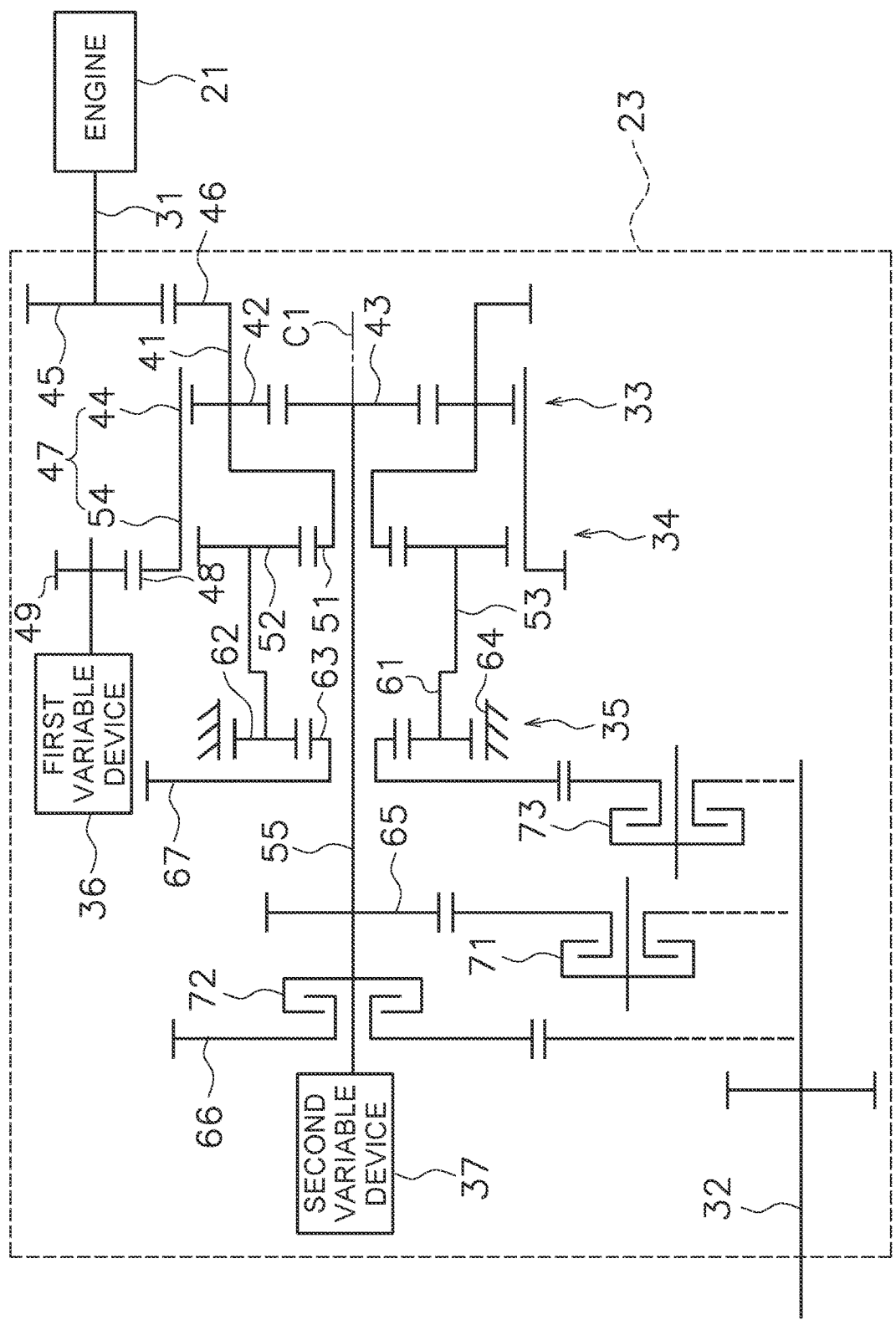
FIG. 2 is a skeleton diagram of the transmission according to the embodiment.

FIG. 2 is a skeleton diagram showing the configuration of the transmission 23. As illustrated in FIG. 2, the transmission 23 includes an input shaft 31, an output shaft 32, a first planetary gear mechanism 33, a second planetary gear mechanism 34, a third planetary gear mechanism 35, a first variable device 36, and a second variable device 37. The input shaft 31 is connected to the engine 21. The output shaft 32 is connected to the traveling device 24. The first planetary gear mechanism 33, the second planetary gear mechanism 34, and the third planetary gear mechanism 35 are arranged coaxially. The input shaft 31 and the output shaft 32 are arranged eccentrically from a central axis C1 of the first planetary gear mechanism 33, the second planetary gear mechanism 34, and the third planetary gear mechanism 35.

The first planetary gear mechanism 33 includes a first carrier 41, a plurality of first planetary gears 42, a first sun gear 43, and a first ring gear 44. The first carrier 41 is connected to the input shaft 31. An input gear 45 is connected to the input shaft 31. The first carrier 41 includes an external tooth type gear 46. The gear 46 of the first carrier 41 meshes with the input gear 45. The first planetary gears 42 are connected to the first carrier 41. The first planetary gears 42 are rotatable around the central axis C1 together with the first carrier 41. The first sun gear 43 meshes with the first planetary gears 42 and is connected to the first planetary gears 42. The first ring gear 44 meshes with the first planetary gears 42 and is connected to the first planetary gears 42.

The second planetary gear mechanism 34 includes a second sun gear 51, a plurality of second planetary gears 52, a second carrier 53, and a second ring gear 54. The second sun gear 51 is connected to the first carrier 41. The second sun gear 51 is rotatable around the central axis C1 together with the first carrier 41. The second planetary gears 52 mesh with the second sun gear 51 and are connected to the second sun gear 51. The second carrier 53 is connected to the second planetary gears 52. The second carrier 53 is rotatable around the central axis C1 together with the second planetary gears 52. The second ring gear 54 meshes with the second planetary gears 52 and is connected to the second planetary gears 52.

The second ring gear 54 is connected to the first ring gear 44. The first ring gear 44 and the second ring gear 54 are integrally formed. Specifically, the transmission 23 includes a ring member 47. The ring member 47 is a component including the first ring gear 44 and the second ring gear 54 that are integrated. An outer peripheral surface of the ring member 47 includes an external tooth type gear 48. The gear 48 of the ring member 47 is connected to the first variable device 36.

The first variable device 36 is a hydraulic pump/motor. The displacement of the first variable device 36 is controlled by the controller 27. The controller 27 controls the rotation speed of the first variable device 36. As a result, the first variable device 36 continuously changes the speed ratio of the output shaft 32 to the input shaft 31. A gear 49 is connected to the rotation shaft of the first variable device 36. The gear 49 of the first variable device 36 meshes with the gear 48 of the ring member 47.

The third planetary gear mechanism 35 includes a third carrier 61, a plurality of third planetary gears 62, a third sun gear 63, and a third ring gear 64. The third carrier 61 is connected to the second carrier 53. The third carrier 61 is rotatable around the central axis C1 together with the second carrier 53. The third carrier 61 may be integrated with the second carrier 53. Alternatively, the third carrier 61 may be provided separately from the second carrier 53. The third planetary gears 62 are connected to the third carrier 61. The third planetary gears 62 are rotatable around the central axis C1 together with the third carrier 61.

The third sun gear 63 meshes with the third planetary gears 62 and is connected to the third planetary gears 62. The third ring gear 64 meshes with the third planetary gears 62 and is connected to the third planetary gears 62. The third ring gear 64 is non-rotatable. The third ring gear 64 is fixed to, for example, the housing of the transmission 23. The third planetary gear mechanism 35 speeds up and outputs the rotation from the second planetary gear mechanism 34.

The second variable device 37 is a hydraulic pump/motor. The second variable device 37 is connected to the first variable device 36 by a hydraulic circuit (not illustrated). When the first variable device 36 functions as a pump and discharges the hydraulic fluid, the second variable device 37 functions as a motor and is driven by the hydraulic fluid from the first variable device 36. Conversely, when the second variable device 37 functions as a pump and discharges the hydraulic fluid, the first variable device 36 functions as a motor and is driven by the hydraulic fluid from the second variable device 37.

The displacement of the second variable device 37 is controlled by the controller 27. The controller 27 controls the rotation speed of the second variable device 37. As a result, the second variable device 37 continuously changes the speed ratio. The second variable device 37 is arranged coaxially with the second planetary gear mechanism 34. In an extending direction of the central axis C1, the second planetary gear mechanism 34 and the third planetary gear mechanism 35 are arranged between the second variable device 37 and the first planetary gear mechanism 33.

A shaft 55 is connected to the rotating shaft of the second variable device 37. The shaft 55 is connected to the first sun gear 43. The shaft 55 directly connects the first sun gear 43 and the second variable device 37. The shaft 55 is arranged coaxially with the first to third planetary gear mechanisms 34 to 35. The shaft 55 passes through an opening of the second sun gear 51 and an opening of the third sun gear 63.

The transmission 23 includes a low speed gear 65, a high speed gear 66, a medium speed gear 67, a low speed clutch 71, a high speed clutch 72, and a medium speed clutch 73. The low speed gear 65, the high speed gear 66, and the medium speed gear 67 are arranged coaxially with the first to third planetary gear mechanisms 34 to 35. The low speed gear 65 is connected to the shaft 55. The low speed gear 65 is rotatable around the central axis C1 together with the shaft 55. The low speed gear 65 is connected to the output shaft 32 via the low speed clutch 71.

The high speed gear 66 is connected to the shaft 55 via the high speed clutch 72. When the high speed clutch 72 is in an engaged state, the high speed gear 66 is rotatable together with the shaft 55. The high speed gear 66 is connected to the output shaft 32. The medium speed gear 67 is connected to the third sun gear 63. The medium speed gear 67 is integrally formed with the third sun gear 63. However, the medium speed gear 67 may be provided separately from the third sun gear 63. The medium speed gear 67 is rotatable around the central axis C1 together with the third sun gear 63.

The low speed gear 65, the high speed gear 66, and the medium speed gear 67 are arranged between the third planetary gear mechanism 35 and the second variable device 37 in the extending direction of the central axis C1. The low speed clutch 71, the high speed clutch 72, and the medium speed clutch 73 are arranged between the third planetary gear mechanism 35 and the second variable device 37 in the extending direction of the central axis C1. The low speed clutch 71, the high speed clutch 72, and the medium speed clutch 73 are, for example, hydraulic clutches. The low speed clutch 71, the high speed clutch 72, and the medium speed clutch 73 are controlled by the controller 27.

The low speed clutch 71 switches engaging and disengaging between the output shaft 32 and the shaft 55. When the low speed clutch 71 is in an engaged state, the rotation of the shaft 55 is transmitted to the output shaft 32 via the low speed gear 65. The high speed clutch 72 switches engaging and disengaging between the output shaft 32 and the shaft 55. When the high speed clutch 72 is in the engaged state, the rotation of the shaft 55 is transmitted to the output shaft 32. The medium speed clutch 73 switches engaging and disengaging between the output shaft 32 and the third sun gear 63. When the medium speed clutch 73 is in the engaged state, the rotation of the third sun gear 63 is transmitted to the output shaft 32 via the medium speed gear 67.

In FIG. 2, a part of the configuration between the clutches 71 to 73 and the output shaft 32 is omitted. Another clutch or gear may be arranged between the clutches 71 to 73 and the output shaft 32. For example, a forward gear and a reverse gear may be arranged between the clutches 71 to 73 and the output shaft 32.

FIG. 3A, FIG. 3B, FIG. 3C and FIG. 3D are operating characteristic diagrams of the transmission 23. FIG. 3A shows the rotation speeds of the first and second variable devices 36 and 37 with respect to the vehicle speed. In FIG. 3A, the broken line indicates the rotation speed of the first variable device 36. The solid line shows the rotation speed of the second variable device 37. FIG. 3B shows the displacements of the first and second variable devices 36 and 37 with respect to the vehicle speed. In FIG. 3B, the broken line indicates the displacement of the first variable device 36. The solid line shows the displacement of the second variable device 37.

FIG. 3C shows the states of the clutches 71 to 73 for each vehicle speed range. The vehicle speed range includes a low speed range, a medium speed range, and a high speed range. The low speed range is a range in which the vehicle speed is 0 or more and less than V1. The medium speed range is a range in which the vehicle speed is V1 or more and less than V2. The high speed range is a range in which the vehicle speed is V2 or more and less than V3. In FIG. 3C, "ON" indicates that the clutches 71 to 73 are in the engaged state. "OFF" indicates that the clutches 71 to 73 are in the disengaged state.

FIG. 3D shows the relative speeds of the clutches 71 to 73 with respect to the vehicle speed. In FIG. 3D, "Low" indicates the relative speed of the low speed clutch 71. "Mid" indicates the relative speed of the medium speed clutch 73. "High" indicates the relative speed of the high speed clutch 72.

The controller 27 controls the displacements of the first and second variable devices 36 and 37 and the states of the clutches 71 to 73 according to the vehicle speed. As illustrated in FIG. 3D, when the vehicle speed is 0, the relative speed of the low speed clutch 71 is 0. As illustrated in FIG. 3C, the controller 27 sets the low speed clutch 71 in the engaged state when the vehicle speed is 0. Further, the controller 27 sets the medium speed clutch 73 and the high speed clutch 72 in the disengaged state. As a result, the driving force input from the engine 21 to the input shaft 31 is transmitted to the output shaft 32 via the first carrier 41, the first planetary gears 42, the first sun gear 43, the shaft 55, and the low speed gear 65.

The controller 27 maintains the low speed clutch 71 in the engaged state when the vehicle speed is within the low speed range. As illustrated in FIG. 3B, the controller 27 controls the displacements of the first and second variable devices 36 and 37 according to the vehicle speed. As a result, as illustrated in FIG. 3A, when the vehicle speed is within the low speed range, the rotation speed of the first variable device 36 decreases and the rotation speed of the second variable device 37 increases as the vehicle speed increases.

As illustrated in FIG. 3D, when the vehicle speed is V1, the relative speed of the medium speed clutch 73 is 0. As illustrated in FIG. 3C, when the vehicle speed reaches V1, the controller 27 sets the medium speed clutch 73 in the engaged state. Further, the controller 27 sets the low speed clutch 71 and the high speed clutch 72 in the disengaged state. As a result, the driving force input from the engine 21 to the input shaft 31 is transmitted to the output shaft 32 via the first carrier 41, the second sun gear 51, the second carrier 53, the third carrier 61, the third planetary gears 62, the third sun gear 63, and the medium speed gear 67.

The controller 27 maintains the medium speed clutch 73 in the engaged state when the vehicle speed is within the medium speed range. As illustrated in FIG. 3B, the controller 27 controls the displacements of the first and second variable devices 36 and 37 according to the vehicle speed. As a result, as illustrated in FIG. 3A, when the vehicle speed is within the medium speed range, the rotation speed of the first variable device 36 increases and the rotation speed of the second variable device 37 decreases as the vehicle speed increases.

As illustrated in FIG. 3D, when the vehicle speed is V2, the relative speed of the high speed clutch 72 is 0. As illustrated in FIG. 3C, the controller 27 sets the high speed clutch 72 in the engaged state when the vehicle speed is V2. Further, the controller 27 sets the low speed clutch 71 and the medium speed clutch 73 in the disengaged state. As a result, the driving force input from the engine 21 to the input shaft 31 is transmitted to the output shaft 32 via the first carrier 41, the first planetary gears 42, the first sun gear 43, the shaft 55, and the high speed gear 66.

The controller 27 maintains the high speed clutch 72 in the engaged state when the vehicle speed is within the high speed range. As illustrated in FIG. 3B, the controller 27 controls the displacements of the first and second variable devices 36 and 37 according to the vehicle speed. As a result, as illustrated in FIG. 3A, when the vehicle speed is within the high speed range, the rotation speed of the first variable device 36 decreases and the rotation speed of the second variable device 37 increases as the vehicle speed increases.

In the transmission 23 according to the present embodiment described above, the second ring gear 54 is connected to the first ring gear 44. Therefore, a large clutch connected to the first ring gear 44 or the second ring gear 54 is unnecessary. Further, the number of external tooth type gears provided in the first ring gear 44 and the second ring gear 54 can be reduced. Thereby, the transmission 23 can be downsized.

As illustrated in FIG. 3A, the rotation directions of the first and second variable devices 36 and 37 are the same over the entire speed range. Therefore, a pump having a simple structure can be adopted as the first and second variable devices 36 and 37. Thereby, the transmission 23 can be downsized.

The input shaft 31 is connected to the first carrier 41 of the first planetary gear mechanism 33. The first ring gear 44 of the first planetary gear mechanism 33 is connected to the first variable device 36 via the external tooth type gear 48. Further, the first sun gear 43 of the first planetary gear mechanism 33 is directly connected to the second variable device 37. Thereby, the mechanism for input division of the transmission 23 suitable for the used rotation range of the first and second variable devices 36 and 37 can be simply and compactly configured.

The second carrier 53 of the second planetary gear mechanism 34 is connected to the third carrier 61 of the third planetary gear mechanism 35. The third sun gear 63 of the third planetary gear mechanism 35 is integrated with the medium speed gear 67. Further, the third planetary gear mechanism 35 is arranged coaxially with the first planetary gear mechanism 33 and the second planetary gear mechanism 34. Thereby, the transmission 23 can be downsized.

Although one embodiment of the present invention has been described above, the present invention is not limited to the above embodiment, and various modifications can be made without departing from the gist of the invention. The work vehicle 1 is not limited to the wheel loader, and may be another vehicle such as a bulldozer or a hydraulic excavator.

The configuration of the transmission 23 may be changed. For example, the connection relationship between the rotating element of the first planetary gear mechanism 33 and the rotating element of the second planetary gear mechanism 34 may be changed. The connection relationship between the rotating element of the second planetary gear mechanism 34 and the rotating element of the third planetary gear mechanism 35 may be changed. The second ring gear 54 may be provided separately from the first ring gear 44.

The arrangement of the first variable device 36 and/or the second variable device 37 may be changed. The first variable device 36 and/or the second variable device 37 is not limited to the hydraulic pump/motor, and may be another device such as an electric generator/motor.

The arrangement of the low speed clutch 71 and/or the medium speed clutch 73 and/or the high speed clutch 72 may be changed. Apart of the low speed clutch 71, the medium speed clutch 73, and the high speed clutch 72 may be omitted.

According to the present disclosure, a size of a continuously variable transmission can be reduced by a variable device.

The invention claimed is:

1. A transmission comprising:
an input shaft;
an output shaft;
a first planetary gear mechanism including a first carrier connected to the input shaft, a first planetary gear connected to the first carrier, a first sun gear connected to the first planetary gear, and a ring gear connected to the first planetary gear;
a second planetary gear mechanism including a second sun gear connected to the first carrier such that the second sun gear rotates integrally with the first carrier, a second planetary gear connected to the second sun gear, and a second ring gear connected to the second planetary gear and connected to the first ring gear; and
a first variable device connected to the first ring gear and the second ring gear to continuously change a speed ratio of the output shaft to the input shaft.

2. A transmission comprising:
an input shaft;
an output shaft;
a first planetary gear mechanism including a first carrier connected to the input shaft, a first planetary gear connected to the first carrier, a first sun gear connected to the first planetary gear, and a ring gear connected to the first planetary gear;
a second planetary gear mechanism including a second sun gear connected to the first carrier, a second planetary gear connected to the second sun gear, and a second ring gear connected to the second planetary gear and connected to the first ring gear;
a first variable device connected to the first ring gear and the second ring gear to continuously change a speed ratio of the output shaft to the input shaft;
a second variable device that continuously changes the speed ratio; and
a connecting shaft that directly connects the first sun gear and the second variable device.

3. The transmission according to claim 2, wherein the second variable device is arranged coaxially with the second planetary gear mechanism.

4. The transmission according to claim 2, further comprising:
a high speed gear connected to the output shaft; and
a high speed clutch that switches engaging and disengaging between the high speed gear and the connecting shaft.

5. The transmission according to claim 2, further comprising:
a low speed gear connected to the connecting shaft; and
a low speed clutch that switches engaging and disengaging between the output shaft and the low speed gear.

6. A transmission comprising:
an input shaft;
an output shaft;
a first planetary gear mechanism including a first carrier connected to the input shaft, a first planetary gear connected to the first carrier, a first sun gear connected to the first planetary gear, and a ring gear connected to the first planetary gear;
a second planetary gear mechanism including a second sun gear connected to the first carrier, a second planetary gear connected to the second sun gear, and a second ring gear connected to the second planetary gear and connected to the first ring gear; and
a first variable device connected to the first ring gear and the second ring gear to continuously change a speed ratio of the output shaft to the input shaft,
the second planetary gear mechanism further including a second carrier connected to the second planetary gear, and
the transmission further comprising:
a third planetary gear mechanism including a third carrier connected to the second carrier, a third planetary gear connected to the third carrier, and a third sun gear connected to the third planetary gear.

7. The transmission according to claim 6, wherein the third planetary gear mechanism is arranged coaxially with the first planetary gear mechanism and the second planetary gear mechanism.

8. The transmission according to claim 6, further comprising:
an external tooth gear connected to the third sun gear.

9. The transmission according to claim 6, further comprising:
a medium speed clutch that switches engaging and disengaging between the output shaft and the third sun gear.

10. The transmission according to claim 1, wherein the first ring gear and the second ring gear are integrally formed.

11. A transmission comprising:
an input shaft;
an output shaft;
a first planetary gear mechanism including a first carrier connected to the input shaft, a first planetary gear connected to the first carrier, a first sun gear connected to the first planetary gear, and a ring gear connected to the first planetary gear;

a second planetary gear mechanism including a second sun gear connected to the first carrier, a second planetary gear connected to the second sun gear, and a second ring gear connected to the second planetary gear and connected to the first ring gear;

a first variable device connected to the first ring gear and the second ring gear to continuously change a speed ratio of the output shaft to the input shaft; and a ring member including the first ring gear and the second ring gear, an outer peripheral surface of the ring member including an external tooth gear connected to the first variable device.

12. A work vehicle including the transmission according to claim 1.

* * * * *